B. CRAWFORD, dec'd.
MARY CRAWFORD, Adm'x.
Pyrometer.
No. 161,330.
Patented March 30, 1875.
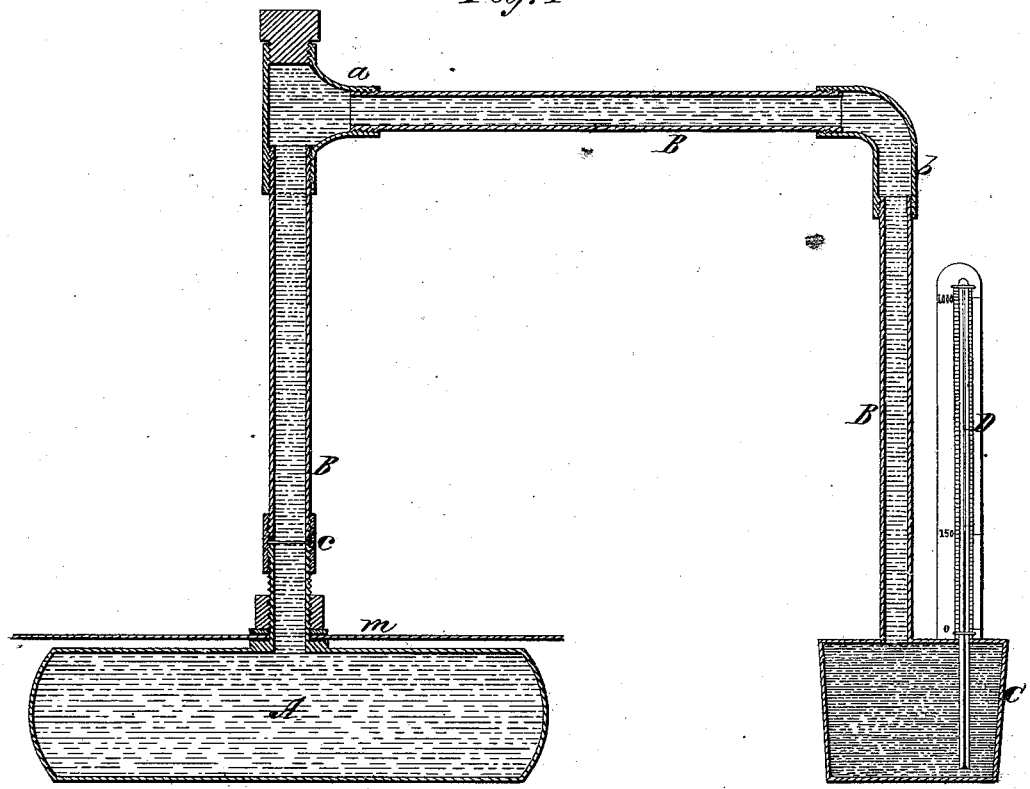

UNITED STATES PATENT OFFICE.

MARY CRAWFORD, OF PITTSBURG, PENNSYLVANIA, ADMINISTRATRIX OF BENJAMIN CRAWFORD, DECEASED.

IMPROVEMENT IN PYROMETERS.

Specification forming part of Letters Patent No. 161,330, dated March 30, 1875; application filed October 31, 1874.

*To all whom it may concern:*

Be it known that BENJAMIN CRAWFORD, deceased, who resided at Pittsburg, in the county of Allegheny and State of Pennsylvania, did in his lifetime invent a new and useful Pyrometric Gage for Steam-Boilers, Furnaces, and other structures which are subjected to the heat of fire; and I do hereby declare that the following is a full, clear, and exact description of the invention of the aforesaid deceased, reference being had to the accompanying drawings forming part of this specification, in which—

Figure 1 is a vertical central section of a liquid pyrometric gage embodying the invention of the aforesaid deceased; it is shown attached to a plate of a steam-boiler.

This invention relates to a liquid-pyrometer for ascertaining high and low temperatures, to be used on steam-boilers, blast-furnaces, and other analogous structures, for indicating the pressure in a boiler by the temperature of the steam, and on blast-furnaces, to find the degree of heat at which the blast is running.

The invention consists of the following parts, viz: a strong, tight receiving-vessel, placed inside the boiler, or where it is desired the temperature should be known; and a metal tube, forming a siphon, and connecting the receiving-vessel with a close mercury-cup, having a glass tube with a graduated scale.

A in the drawing may be a cylinder or other suitably-formed vessel, made of copper, wrought in pipe, or any suitable material, placed inside a steam-boiler, having a tube, B, passing through the boiler-plate *m*, and connecting with a close-fitting joint, *c*, to the main tube B. The tube B is then extended around to the mercury-cup C, having a T-joint, *a*, with screw-nut, and arm-joint *b*. C is a brass mercury-cup, with tight-fitting top, screwed down, and is connected with vessel A by tube B. D is a glass tube fitted in top of mercury-cup C, and extending down close to bottom of said cup. The tube B may be covered with an outside casing, to protect it from cooling too rapidly.

The object sought for in this invention is, when used on steam-boilers, to obtain the temperature of the steam, and knowing that, by a fixed law that governs the amount of pressure due to any degree of temperature, we find in it a perfect indication of the pressure in a boiler. For this purpose we fill the receiving-vessel A and tube B with linseed or lard oil, having the cup filled with mercury. The vessel A is then placed in a linseed-oil bath, which is heated up, and as the oil expands in the receiving-vessel A the pressure of it extends around to the cup, and forces the mercury up the tube D, and the scale is graduated by a Fahrenheit thermometer.

When a higher temperature is required than 600°, I then substitute tin or any suitable metal or alloy that fuses at less than 600° in the receiving-vessel A, having the oil in tube B, and mercury in cup C, as before, and the scale made as above described. As the tin melts and expands, the pressure is communicated to the oil in the tube B, which acts on the mercury in cup C, and a similar result is obtained. The necessity for changing the expanding agents is obvious.

The advantages to be gained by this instrument over the ones now in use I believe are many, there being no works or mechanical contrivances to get out of order, nor the uncertainty of the moving agents expanding and contracting in the same degree after being in use, but giving a like result in all cases, the simplicity of the instrument being in its favor.

What I claim as the invention of BENJAMIN CRAWFORD is—

The combination of the mercury-cup C, provided with a suitable indicating device, and the receiving-vessel A, filled with oil, tin, or a suitable metallic alloy, connected by a tube filled with oil, substantially as and for the purpose set forth.

MARY CRAWFORD,
*Administratrix.*

Witnesses:
C. P. CRAWFORD,
WM. H. STERRITT.